US007317399B2

(12) United States Patent
Chyun

(10) Patent No.: US 7,317,399 B2
(45) Date of Patent: Jan. 8, 2008

(54) REMOTE MONITORING SYSTEM FOR EXTERMINATING PEST AND A METHOD THEREOF

(75) Inventor: Chan Hyuk Chyun, Seoul (KR)

(73) Assignee: Cesco Co., Ltd., Seoul (KR)

( * ) Notice: Subject to any disclaimer, the term of this patent is extended or adjusted under 35 U.S.C. 154(b) by 215 days.

(21) Appl. No.: 10/526,341

(22) PCT Filed: Sep. 2, 2003

(86) PCT No.: PCT/KR03/01790

§ 371 (c)(1),
(2), (4) Date: Mar. 2, 2005

(87) PCT Pub. No.: WO2004/021735

PCT Pub. Date: Mar. 11, 2004

(65) Prior Publication Data

US 2006/0149509 A1 Jul. 6, 2006

(30) Foreign Application Priority Data

Sep. 2, 2002 (KR) ...................... 10-2002-0052405
Sep. 2, 2003 (KR) ...................... 10-2003-0060978

(51) Int. Cl.

| | |
|---|---|
| ***G08B 23/00*** | (2006.01) |
| ***G08B 1/08*** | (2006.01) |
| ***G09F 25/00*** | (2006.01) |
| ***A01M 1/00*** | (2006.01) |
| ***A01M 1/20*** | (2006.01) |

(52) U.S. Cl. ............................... 340/573.1; 340/573.2; 340/286.01; 340/539.26; 43/58; 43/132.1

(58) Field of Classification Search ..................... None
See application file for complete search history.

(56) References Cited

U.S. PATENT DOCUMENTS

| | | | | |
|---|---|---|---|---|
| 6,445,301 | B1 * | 9/2002 | Farrell et al. | 340/573.2 |
| 7,020,996 | B2 * | 4/2006 | Beroza et al. | 43/124 |
| 2001/0054962 | A1 * | 12/2001 | Barber et al. | 340/573.2 |
| 2003/0069697 | A1 * | 4/2003 | Mafra-Neto et al. | 702/2 |
| 2003/0184442 | A1 * | 10/2003 | Gardner et al. | 340/573.2 |

FOREIGN PATENT DOCUMENTS

| | | |
|---|---|---|
| JP | 2000-004756 | 1/2000 |
| KR | 10-1995-0004025 A | 2/1995 |
| KR | 10-2000-0033818 A | 6/2000 |
| KR | 10-2000-0050327 A | 8/2000 |

* cited by examiner

*Primary Examiner*—Julie Bichngoc Lieu
(74) *Attorney, Agent, or Firm*—The Eclipse Group LLP; Kevin E. Flynn

(57) ABSTRACT

A remote monitoring system for exterminating pest comprises at least one sensor, installedd at a plurality of zones of a subject site, for sensing movement of the pest in the zones, and producing and transmitting detection signals corresponding to the movement; at least one remote controller installed at the subject site, for receiving the detection signals and processing and transmitting the received detection signals; and a central control apparatus for receiving information from at least one remote controller, analyzing the information and managing the analyzed information by the zones.

20 Claims, 17 Drawing Sheets

Fig. 6

| Cockroaches | Population | Grade |
|---|---|---|
| Sensor-1 | 2 | L1 |
| Sensor-2 | 0 | - |
| Sensor-3 | 3 | L1 |
| Sensor-4 | 0 | - |
| Sensor-5 | 0 | - |
| Sensor-6 | 0 | - |
| Sensor-7 | 8 | L2 |
| Sensor-8 | 1 | L1 |
| Sensor-9 | 0 | - |
| Sensor-10 | 0 | - |

Fig. 7a

| Pest | Table 1 | | |
|---|---|---|---|
| Rats | Alarm | L1 | L2 |
| | B | 1 | |
| | | 2 | |
| | | 3 | |
| | C | 4 | 1 |

Fig. 7c

| Pest | Table 1 | | | |
|---|---|---|---|---|
| Flying Insects | Alarm | L1 | L2 | L3 |
| | B | | 1 | |
| | C | | 2 | 1 |

Fig. 7b

| Pest | Table 1 | | | | Table 2 | | | | Table 3 | | | |
|---|---|---|---|---|---|---|---|---|---|---|---|---|
| | Alarm | L1 | L2 | L3 | Alarm | L1 | L2 | L3 | Alarm | L1 | L2 | L3 |
| Cockroaches | A | 1 | 1 | | A | 1 | | | B | 1 | | |
| | | 2 | 2 | | | 2 | 1 | | C | 2 | 1 | 1 |
| | | 3 | | | B | 3 | | | | | | |
| | | 4 | | | | 4 | | | | | | |
| | B | 5 | 3 | | C | 5 | 2 | 1 | | | | |
| | | 6 | 4 | | | | | | | | | |
| | | 7 | | | | | | | | | | |
| | | 8 | | | | | | | | | | |
| | | 9 | | 1 | | | | | | | | |
| | C | 10 | 5 | 2 | | | | | | | | |

Fig. 8

| Zone Code | | Zone Name | Table to be applied | | |
|---|---|---|---|---|---|
| | | | Cock-roaches | Rats | Flying Insects |
| 110 | Out Blocks | Outer Blocks | 1 | 1 | 1 |
| 200 | Restaurants | Dining Area | 1 | 1 | 1 |
| 240 | Kitchens | Kitchens | 1 | 1 | 1 |
| 300 | Halls | Halls | 2 | 1 | 1 |
| 400 | Building Maintenance | Building Maintenance Facilities | 2 | 1 | 1 |
| 500 | Supplementary Facilities | Supplementary Facilities | 2 | 1 | 1 |
| 600 | Business Attachments | Business Attachments | 2 | 1 | 1 |
| 601 | Business Attachments | Food stores | 2 | 1 | 1 |
| 602 | Business Attachments | Shops | 2 | 1 | 1 |
| 701 | Medical Facilities | Clinics | 3 | 1 | 1 |
| 702 | Medical Facilities | Wards | 2 | 1 | 1 |
| 703 | Medical Facilities | Emergency Rooms | 3 | 1 | 1 |
| 704 | Medical Facilities | Mortuaries | 2 | 1 | 1 |
| 705 | Medical Facilities | Examination Rooms | 3 | 1 | 1 |
| 800 | Production Lines | Production Lines (overall) | 2 | 1 | 1 |
| 901 | Common Space | Offices | 3 | 1 | 1 |
| 902 | Common Space | Lavatories | 1 | 1 | 1 |
| 903 | Common Space | VIP Rooms | 3 | 1 | 1 |
| 904 | Common Space | Guest Rooms | 3 | 1 | 1 |
| 905 | Common Space | VIP Room | 3 | 1 | 1 |
| 906 | Common Space | General Wards | 3 | 1 | 1 |
| 907 | Common Space | Vending Machines | 3 | 1 | 1 |
| 908 | Common Space | Dormitory | 2 | 1 | 1 |
| 909 | Common Space | Lodge | 2 | 1 | 1 |
| 910 | Common Space | Shade Houses | 2 | 1 | 1 |
| 911 | Common Space | Pantries | 2 | 1 | 1 |
| 912 | Common Space | Lobby | 2 | 1 | 1 |
| 999 | Etc. | Etc. | 2 | 1 | 1 |

Fig. 9a

[DD/MM/YYYY] Pest-Related Information Report

Number of Pest in Activity per Each Building [Period 1]

| Pest | Outer Blocks | | | Store-houses | | Production Buildings | | | |
|---|---|---|---|---|---|---|---|---|---|
| | L1 | L2 | L3 | L1 | L2 | Production Dep. | Storage Dep. | Aging Rooms | Lava-tory |
| Cockroaches | | | | | | | | | |
| Flying Insects | | | | | | | | | |
| Rats | | | | | | | | | |

Number of Pest in Activity per Each Building [Period 2]

| Pest | Outer Blocks | | | Store-houses | | Production Buildings | | | |
|---|---|---|---|---|---|---|---|---|---|
| | L1 | L2 | L3 | L1 | L2 | Production Dep. | Storage Dep. | Aging Rooms | Lava-tory |
| Cockroaches | | | | | | | | | |
| Flying Insects | | | | | | | | | |
| Rats | | | | | | | | | |

Number of Pest in Activity per Each Building [Period 3]

| Pest | Outer Blocks | | | Store-houses | | Production Buildings | | | |
|---|---|---|---|---|---|---|---|---|---|
| | L1 | L2 | L3 | L1 | L2 | Production Dep. | Storage Dep. | Aging Rooms | Lava-tory |
| Cockroaches | | | | | | | | | |
| Flying Insects | | | | | | | | | |
| Rats | | | | | | | | | |

Fig. 9b

| | Large Group | Production Building | Location Description | | | |
|---|---|---|---|---|---|---|
| No. | Fl./Middle Group | Small Group | | Zone Code | Equipment /Quantity | Vulnerable Zone |
| | B1/Office | Customer Center | | | | |
| | / | Education Room | | | | |
| | /Storehouse | ACS Storehouse | | | | |
| | / | Document Storehouse | | | | |
| | Lobby | Lobby | | | | |
| | / | Lavatory | | | | |
| | Fl.1 / Production Line 1 | Production Dep. | Next to Elevator | 200 | A-2/3 | |
| | / | Storage Dep. | Next to Lavatory | 200 | A-3/2 | |
| | / | Aging Room | Opposite to Elevator | 603 | C-2/4 | √ |
| | / | Lavatory | Left of Staircase | 912 | C-1/4 | |
| | Rooftop/Rooftop | Rooftop | | | | |
| | / | Animal Breeding Room | | | | |

REMOTE MONITORING SYSTEM FOR EXTERMINATING PEST AND A METHOD THEREOF

TECHNICAL FIELD

The present invention relates to a remote monitoring system for exterminating pest and a method thereof, and more particularly to a remote monitoring system for exterminating or preventing pest by detecting and monitoring their invasion and activity in a remote place.

BACKGROUND ART

Pest brings tremendous losses, by invading houses or buildings and damaging to buildings and facilities, giving unpleasant feelings to residents, and carrying germs and pathogenic organisms. Accordingly, various methods for exterminating and preventing pest and their invasion have been proposed. Herein, the term "pest" represents all harmful insects and animals, such as cockroaches, ants, rats and weasels, and harmful birds.

In a conventional pest control method, a pest control service technician (hereinafter, "service technician") visits a building (hereinafter, "pest control subject site") and understands the situation by personally investigating the circumstances and interviewing the residents, and takes measures for pest control accordingly.

A problem with the conventional method is that it is difficult to obtain detailed information with respect to the ecology of the pest inside the pest control subject site, such as invasion paths of the pest, location of activity, types, chemicals to which the pest have tolerance, unless the service technician personally visits and closely investigates the site. In case a pest control measure is established by obtaining information through site visits, a large cost of human resources and extra expenses are incurred. Further, the amount and credibility of information with regard to the pest and the efficiency of the pest control are very dependent on the skill of the individual service technicians.

To resolve such problems, automated systems and methods, which enable a service technician to know the status of pest without visiting a pest control subject site, have been proposed. These conventional systems and methods, however, lack means for effectively performing pest control. Especially, these conventional systems and methods do not consider characteristics of zones or sections in a building even though the appearance and activity of the pest may be different from zone to zone in the same pest control subject site, according to the circumstances of each site. Accordingly, even if information required to perform pest control is obtained, the efficiency of the pest control may not be optimized since the obtained information is not systematically managed for each zone in a building. For example, when revisiting the pest control subject site, the service technician has to check again each location where the appearance of the pest is detected. Otherwise, he has to apply the pest control measure to the whole pest control subject site even when only some zones or sections in that building are invaded by the pest despite of inefficiency and excessive use of chemicals.

DISCLOSURE OF THE INVENTION

Therefore, an objective of the present invention is to provide a method and a system for systematically obtaining and maintaining information on the pest ecology and pest control history with respect to a pest control subject site.

Another objective of the present invention is to provide a remote monitoring system for exterminating pest by centrally collecting and managing in a remote place the information on pest ecology and pest control history collected from each of pest control subject sites.

Yet another objective of the present invention is to provide a remote monitoring method for exterminating pest by collecting and managing the information on pest ecology according to zones, thereby effectively performing pest control on the pest control subject sites.

BRIEF DESCRIPTION OF THE DRAWINGS

The above and other objectives and aspects of the invention are apparent from the following description of embodiments with reference to the accompanying drawing.

FIG. 6 is a table representing an analysis result for the activities of cockroaches in a zone.

FIGS. 7*a* to 7*c* are alarm tables used for determining a pest control time by a module for determining pest control time.

FIG. 8 is an application table for determining which alarm table should be applied based on zone codes.

FIGS. 9*a* and 9*b* show examples of reports produced by the central control apparatus of the remote monitoring system shown in FIG. 1.

MODES FOR CARRYING OUT THE INVENTION

Figure 1:
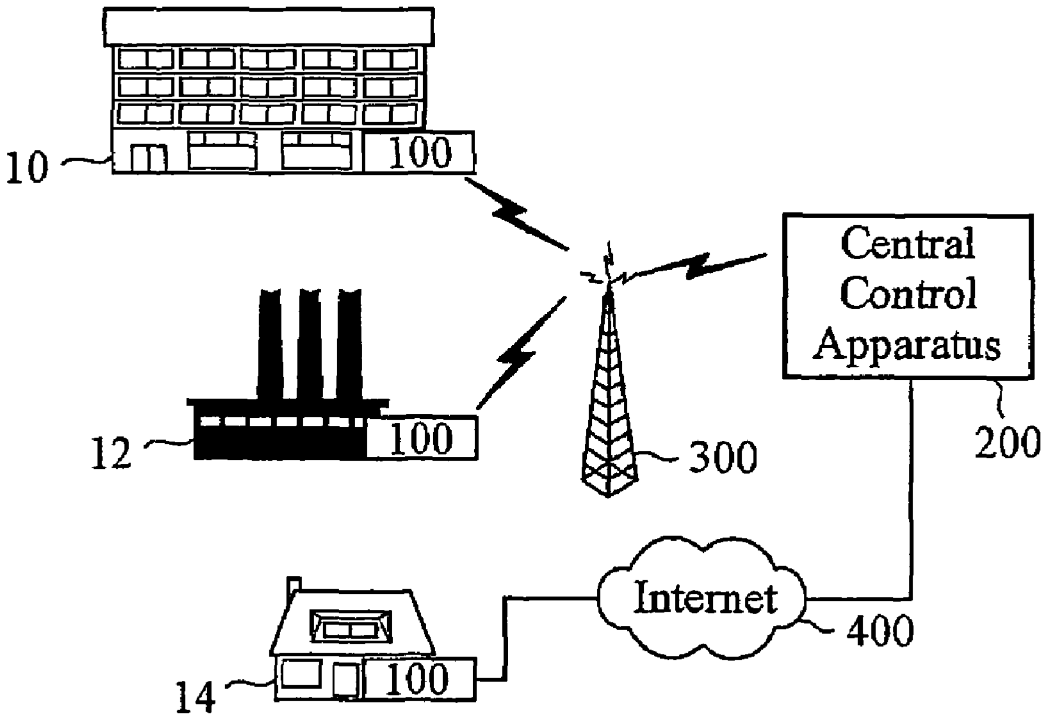
FIG. 1 is a schematic diagram of a remote monitoring system for exterminating pest in accordance with a first embodiment of the present invention.

A remote monitoring system for exterminating pest, comprises at least one sensor, installed at a plurality of zones of a subject site, for sensing movement of the pest in the zones, and producing and transmitting detection signals corresponding to the sensed movement; at least one remote controller, installed at the subject site, for receiving said detection signals and processing and transmitting the received detection signals; and a central control apparatus for receiving information from said remote controller, analyzing and managing the information by the zones.

The remote controller preferably comprises: a receiving module for receiving the detection signals from the sensor; a detection information processing module for receiving and processing the detection signals, and collecting pest-related information; and a transmitting module for transmitting the processed pest-related information to the central control apparatus.

The remote controller preferably comprises a transmission time determining module for determining whether to transmit the pest-related information immediately or not; and a memory for temporally storing a process result of the pest-related information for predetermined period until the pest-related information is tramsmitted, in case that the transmission time determining module determines not to transmit the pest-related information immediately.

The central control apparatus preferably comprises: a pest-related information analyzing module for receiving and analyzing, in each of the zones, the pest-related information transmitted from the remote controller, a pest-related information managing module for, in a form of database, storing, updating and managing the pest-related information transmitted from the remote controller, a database managed by the pest-related information managing module; a pest control time determining module for determining whether to perform a pest control work immediately or not on the basis of the analysis result from the pest-related information analyzing module; and a communication module for performing wired/wireless communications.

Preferably, the pest-related information analyzing module decides grade of each sensor on the basis of population of the detected pest, and the pest control time determining module determines a pest control time of each zone on the basis of the grade of each sensor in each zone.

Further, a remote monitoring method for exterminating pest comprises the steps of: sectioning a subject site into a plurality of zones; collecting pest-related information by sensing pest in active at each of the sectioned zones; transmitting the collected pest-related information to a central control apparatus; analyzing the pest-related information transmitted; updating and storing the analyzed pest-related information by comparing it with pre-stored information in a database; and determining a pest control time on the basis of the analyzed pest-related information.

The step of sectioning the subject site further comprises a step of sectioning the subject site into a plurality of physical zones.

Alternatively, the step of sectioning the object further comprises a step of sectioning each zone within the object based on a function of each zone.

The step of sectioning the subject site further comprises a step of sectioning each area within the subject site into a plurality of minimum units on which the pest control is to be performed.

Codes are assigned to the minimum units, and the step of analyzing the pest-related information further comprises a step of arranging the pest-related information by the codes assigned to the minimum units.

Now, preferred embodiments of the present invention will be described in detail with reference to the accompanying drawings.

Referring to FIG. 1, a schematic diagram shows a remote monitoring system for exterminating pest in accordance with a first embodiment of the present invention.

As illustrated, the remote monitoring system in accordance with the first embodiment of the present invention comprises remote monitoring apparatus 100 and central control apparatus 200. Remote monitoring apparatus 100 is installed at each building 10, 12, 14, i.e., the pest control subject site, and monitors the activities of pest, collects information related to the activities, and transmits the collected information through wireless communication network 300 or wired communication network 400, such as the Internet or a public switched telephone network. Central control apparatus 200 receives the information related to pest transmitted from remote monitoring apparatus 100, analyzes the received information, and manages the analyzed information. Herein, the term "subject site" means a building at which pest appear or may appear, or predetermined spaces (including public gardens, spaces for loading freights, etc.) and outer area of the building or predetermined spaces.

Remote monitoring apparatus 100, which is installed at each of buildings 10, 12 and 14, monitors the activities of pest and collects information (hereinafter, "pest-related information"), such as the population or number of invaded or captured pest, invasion time, invasion paths, activity sites, and the like, per each type of pest. Preferably, the pest-related information is collected by using predetermined sensors each of which is suitable for sensing specific type of pest, wherein the sensors are decided according to the types of the pest that are expected or have been reported to invade or be present Detailed descriptions of the sensors will be made with reference to FIG. 4.

The collected pest-related information is transmitted to central control apparatus 200 in real time or periodically through wireless communication network 300 or wired communication network 400. The communication networks may be selected from among a public switched telephone network, cables for high-speed Internet, and wireless local area network (LAN) according to the types and conditions of the sites 10, 12, and 14, in which the remote monitoring apparatus 100 has been installed.

Central control apparatus 200 receives and analyzes the pest-related information transmitted from remote monitoring apparatus 100. Preferably, the pest-related information is analyzed to thereby obtain information on, for example, the frequency of appearance and population of pest appearing or captured, based on predetermined analytic categories that are classified by buildings, positions in each building, time and dates and types of pest. Detailed descriptions of analyzing the pest-related information will be made with reference to FIGS. 5 and 6. A pest control measure against pest active in each site is prepared based on the analyzed information in central control apparatus 200. Herein, a pest control measure may be prepared according to the types of active pest, for instance. If it is decided that a pest control operation is required, then the service technician visits a pest control subject site and performs the proper pest control operation based on the analyzed information.

The central control apparatus 200 generates secondary information, which is useful for pest control in, for example, appropriately determining a pest control time, by storing and updating the pest-related information in the database and analyzing it as needed. The central control apparatus 200 may produce a pest control report periodically or a periodically, as needed. Hereinafter, the place at which the central control apparatus 200 is installed is called as a "central control center."

Figure 2:
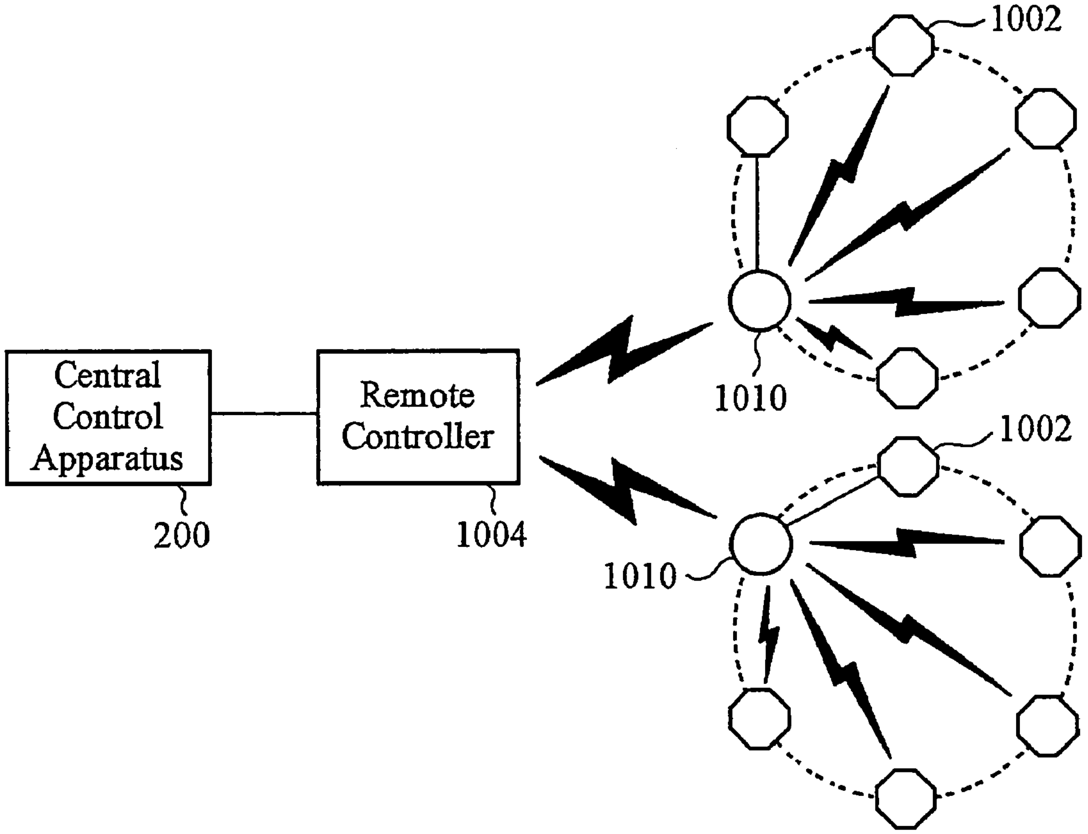
FIG. 2 illustrates a relationship among sensors, repeaters, a remote controller, and a central control apparatus of the remote monitoring system in accordance with the first embodiment of the present invention.

Referring to FIG. 2, a relationship among sensors 1002, repeaters 1010, remote controller 1004, and central control apparatus 200 is shown. The repeaters 1010 are provided for conducting effective wireless communications between sensors 1002 and remote controller 1004. Remote monitoring apparatus 100 has a structure in which a single repeater 1010 is coupled to one or more sensors 1002 and remote controller 1004 is coupled to one or more repeaters 1010.

Figure 3:
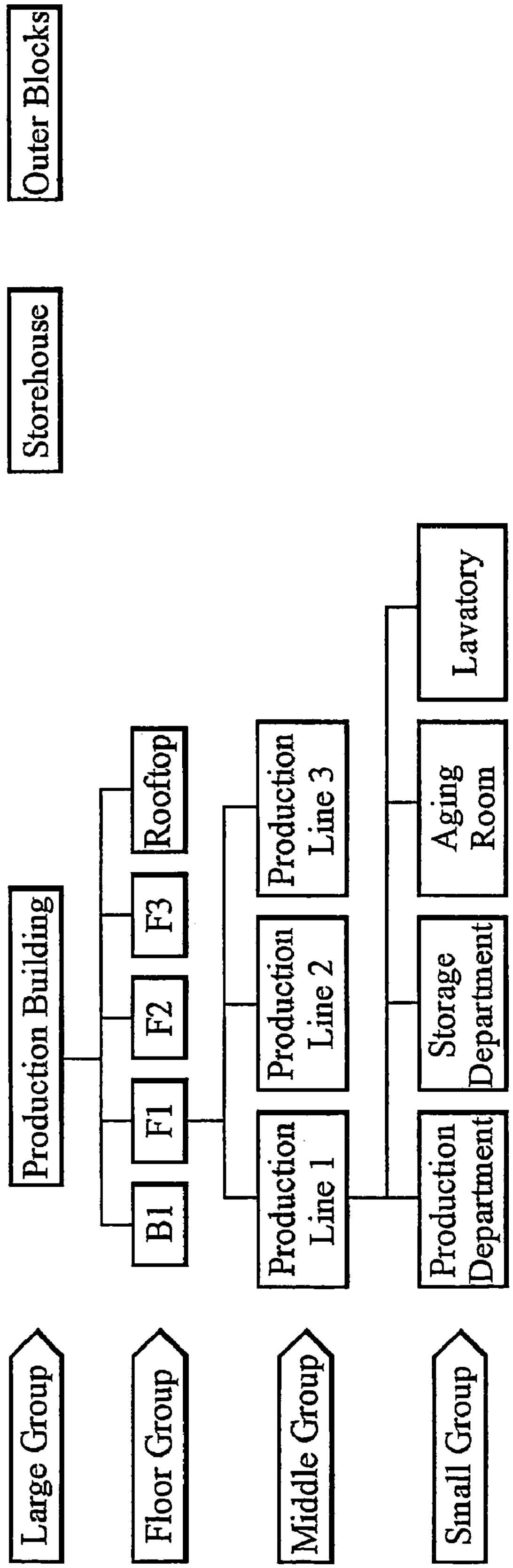
FIG. 3 shows an example of sectioning a pest control subject site in accordance with the present invention.

In the present invention, to manage the pest-related information efficiently, a subject site in a remote place is sectioned into a plurality of zones. Sectioning herein means to divide hierarchically a subject site including a building into a plurality of zones according to the characteristics of the area. In one embodiment of the present invention, a four-stage sectioning is applied to a subject site. In the embodiment, the four-stage sectioning divides a subject site (e.g., an industrial complex as a whole) into a large group including buildings in the industrial complex and their outer blocks; a floor group including each floor in the buildings; a middle group that is a sub-group of the floor group; and a small group that is a sub-group of the middle group. The small group is a minimum unit of sectioning. However, if additional zones in the industrial complex need to be monitored, then the small group may be further sectioned For example, as shown in FIG. 3, production buildings, storehouses, and outer blocks in a factory belong to the large group; floors of the production buildings, such as $1^{st}$ basement, $1^{st}$ floor, $2^{nd}$ floor, $3^{rd}$ floor, and rooftop, belong to the floor group; production lines 1, 2 and 3 on each floor belong to the middle group; and a production department, a storage department, an aging room, and a lavatory in each of the production lines belong to the small group. Those sectioned groups are fundamental units (zones that are typically sectioned by the small grouping, are the minimum units for pest control) for pest control and pest control measures, and are used for analysis and management of pest-related information. For example, analyzing the progress of pest outbreak and effectiveness of pest control is performed on each production line belonging to the middle group to produce pest-related information. An appropriate pest control measure and control equipment are prepared for each production line by using the pest-related information when reforming or increasing production lines.

A zone code is assigned to each zone, which is a unit of the small group. Each facility in a remote place is classified and zone codes are assigned thereto based on the functions of zones in the facility and/or tendency of the pest outbreak thereof. If zone codes of different zones are identical with each other, then a similar tendency of pest outbreak would be expected in such different zones. For zones belonging to different small groups, identical zone codes may be assigned since the zone codes are classified by the functions of zones. For example, even if a computer room and an office room in an office building belong to different small groups, identical zone codes may be assigned to them because they have similar characteristics in terms of pest control and pest control is done in a similar way. Further, even if zones belong to an identical type of small group, different zone codes may be assigned to them by taking into account their middle groups, floor groups, and large groups. For example, although kitchens in a house and in a large-scale restaurant belong to an identical small group, different zone codes may be assigned since the characteristics of the house and the large-scale restaurant are different. By using the zone codes, one can easily find and understand the characteristics and functional zones of a subject site and quickly establishes an appropriate pest control measure, even though the pest control subject site has a complex structure.

In the embodiment of the invention, a subject site is sectioned based on physical units of the building, (such as floors and productions lines) but the criteria for sectioning in the present invention is not limited thereto. For example, a middle group of a subject site may be classified by whether a wired or wireless communication system is suitable for the area A department store, for example, has a first space including shops where there are many obstacles to a wireless communication, such as partitions for separating shops from each other, and a second space including a swimming pool and exercising machines where there is no obstacle to communication. Here, middle groups of the first and second spaces are determined by the type of communication. With reference to the determined middle groups, sensors for wired communication may be installed in the first space and sensors for wireless communication may be installed in the second space. The service technician can systematically install sensors required for each zone of the subject site based on the determined middle group of the site.

Figure 4:
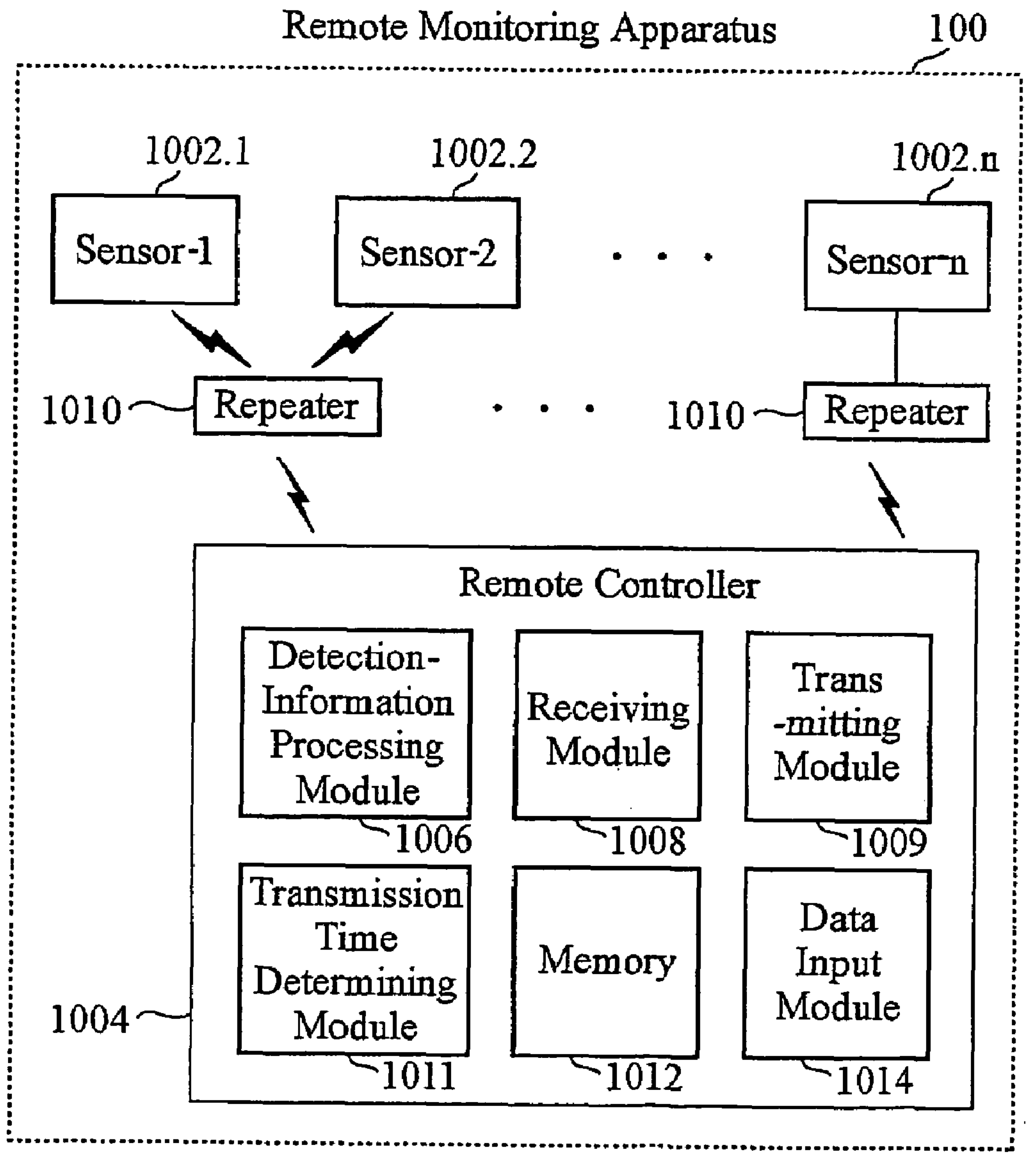
FIG. 4 is a schematic block diagram of an embodiment of a remote monitoring apparatus in the remote monitoring system shown in FIG. 1.

FIG. 4 shows a schematic block diagram of remote monitoring apparatus 100 in the remote monitoring system shown in FIG. 1.

As shown in FIG. 4, remote monitoring apparatus 100 comprises at least one sensor 1002 and remote controller 1004. Sensors 1002, which are installed at predetermined positions of pest control subject site 10, 20, and 30, detect the movements of pest, and provide detection signals corresponding to the movements. Remote controller 1004 receives and processes the detection signals, and transmit processed signals through wired or wireless communication. Herein, the "detection signals" represent whether or not pest are detected, and are produced by sensors 1002 and transmitted to remote controller 1004. In FIG. 4, a solid line between nth sensor 1002.*n* and repeater 1010 represents wired communication and lightening symbols indicate wireless communication.

Locations for installing sensors and the number of sensors 1002 are determined by characteristics of respective zones in sectioned pest control subject sites 10, 20, and 30. More than one types of sensors may be used for each of pest control subject sites 10, 20, and 30. Preferably, various sensors are used to properly monitor several types of pest, for example, first sensor 1002.1 for insects such as cockroaches, second sensor 1002.2 for flying insects such as mosquitoes and flies, and Nth sensor 1002.N for harmful animals such as rats. In one embodiment of the present invention, sensors 1002 are installed to measure the amount of pest activity in a subject site. Sensors 1002, for example, may be implemented by additionally installing a heat detector or a movement detector to conventional pest control equipment, such as an insect luring light, an automatic chemical exposure dispenser, and a luring frame for capturing rodents. Sensors 1002 may also be installed together with pest control device having a birdlime. The degree of pest activity is decided by measuring the population or number of pest lured or captured by using the above equipment.

Locations for installing sensors and the number of sensors 1002 are determined by the type and population of the pest to be exterminated. These may be determined by pest ecology, and the circumstances and location of a specific building. Further, locations for installing sensors and the number of sensors 1002 may be determined based on zone codes assigned to zones of the pest control subject site.

According to the present invention, through the sectioning of the subject site, it becomes easy to manage the positions of sensors 1002 installed in each zone and to analyze, utilize, and maintain the pest-related information produced by sensors 1002. Without sectioning, the service technician must identify the position of each sensor 1002 on a drawing of the subject site or represent the positions in an absolute or relative coordinate system in a complex manner. In the remote monitoring system in accordance with one embodiment of the present invention, the positions of sensors 1002 installed in the subject site may be identified and used with ease and accuracy since the locations are stored in central control apparatus 200 together with information on the sectioned zones. If sensors 1002 are not easily located, a service technician cannot obtain accurate pest-related information. In addition, a captured pest may be kept for long time in pest control equipment so that it may become a new habitat for pest.

Further, in one embodiment of the present invention, due to the sectioning, not only the locations and the number of sensors installed in each zone but also the pest-related information may be managed in relation with the sectioning information, and thus, pest-related information can be managed and analyzed per zone. Therefore, useful information that is effective for pest control in each sectioned zone can be derived from the pest-related information.

Sensors 1002 produce detection signals in response to sensing of the pest. The detection signals are transmitted to remote controller 1004 together with identification signal unique to each sensor 1002 and time-stamp information through wired or wireless communication.

The detection signals may be transmitted from sensors 1002 to remote controller 1004 through repeaters 1010. If the pest control subject sites 10, 12, and 14 occupy a large area or have complicated structure, repeaters 1010 are necessary. The number of repeaters 1010 is determined based on the dimension of the pest control subject sites 10, 12, and 14 and the number of sensors 1002. Generally, installation of the system is easy if transmission of information is done through wireless communication among sensors 1002, repeaters 1010, and remote controller 1004. However, it may be preferable to install communication lines between repeater 1010 and sensor (e.g., Nth sensor 1002.*n*) when the cost is considered depending on the structure and internal configuration of the pest control subject sites 10, 12, and 14 and furniture and facilities arranged therein.

Remote controller 1004 primarily stores and processes the detection signals and the identification signals from sensors 1002, and transit them to central control apparatus 200. Remote monitoring apparatus 100 is installed at selected positions in buildings 10, 12, and 14. The positions should be decided considering the type of communication (i.e., wireless or wired communication), types and conditions of pest control subject sites 10, 12, and 14, and distributions of sensors, such that secure communications are guaranteed and the sensors are not subject to mechanical damage or breakdown.

As shown in FIG. 4, remote controller 1004 comprises functional modules such as detected information processing module 1006, receiving module 1008, transmitting module 1009, transmission time determining module 1011, memory 1012, and data input module 1014. Functions of the modules will be briefly explained below.

Receiving module 1008 receives the detection signals and other information from sensors 1002 or repeaters 1010, and transfers them to detection-information processing module 1006. Detection-information processing module 1006 processes the detection signals to collect pest-related information. Pest-related information contains, for example, types and population of invaded or captured pest, invasion time, invasion path, and invasion place. Other information may be produced according to the types and arrangement of sensors 1002. Pest-related information, which has been processed, is transferred to transmitting module 1009 and transmitting module 1009 transmits it to central control apparatus 200. Transmission time determining module 1011 determines whether to transmit the pest-related information to central control apparatus 200 periodically or in real time. Memory 1012 may be used to store the pest-related information of the subject site. Data input module 1014 is used for the service technician to manually input other pest-related information that is not detected by sensors 1002. Also, it may be used to correct errors, if any, of the pest-related information.

Detailed explanation of remote controller unit 1004 will follow hereinafter.

Detection-information processing module 1006 of remote controller 1004 processes the detection signals transmitted from the respective sensors 1002.1 to 1002.*n* based on the specific identifications of sensors and the time-stamp information. If no detection signal is transmitted for a long time or signals over a predetermined range are transmitted from sensors 1002, detection-information process module 1006 determines that a specific sensor 1002 has failed and generates sensor failure signals indicating an abnormal status of the sensor 1002. Detection-information processing module 1006 transforms the pest-related information into a format suitable for transmission to central control apparatus 200.

Transmitting module 1009 of remote controller 1004 transmits the pest-related information or the sensor failure signals to central control apparatus 200 through wireless communication 300 or wired communication 400.

Transmission time determining module 1011 of remote controller 1004 determines whether the pest-related information is transmitted from remote controller 1004 to central control apparatus 200 periodically (for example, for a certain period in the middle of night) or in real time. Preferably, determination as to whether to transmit periodically or in real time is performed by taking into account conditions such as the types of pest monitored, and types and conditions of the communication network and/or power supply used for remote controller unit 1004. In case of using a public switched telephone network for wired communication 400, the pest-related information may be transmitted to central control apparatus 200 during the night in order to avoid interruption of daytime calls. However, the transmission time determining module 1011 of remote place control unit 1004 may be set to immediately transmit the pest-related information when particular pest, such as rats, appear, or when pest appear in abnormal frequency. When the pest-related information is transmitted periodically, it is stored in memory 1012 for a predetermined period. The pest-related information may be classified by time period, e.g., periods for 0 to 8 o'clock, 8 to 16 o'clock, and 16 to 24 o'clock and separately stored in memory 1012. The pest-related information may be also classified by various other criteria and stored in memory 1012.

Data input module 1014 of remote controller 1004 maybe used for the service technician or a user of the subject site to input other pest-related information, which are not easily collected through sensors 1002. For example, if pest control is performed based on only the pest-related information collected through sensors 1002, information on places where sensors are not installed cannot be obtained. Further, the reliability of the information is affected by incorrect information resulting from an accumulation of errors due to minor operation failures of sensors 1002. Data input module 1014 solves the above problem by allowing a service technician or a user of subject site input supplementary information. Like the pest-related information collected by sensors 1002, the supplementary information is also transmitted to central control apparatus 200 through transmitting module 1009.

The above-described functional modules 1006, 1008, 1009, 1012, and 1014 of remote controller 1004 may be implemented with hardware specifically designed to perform the above-explained functions, or software modules programmed to perform the functions in general hardware.

Figure 5:
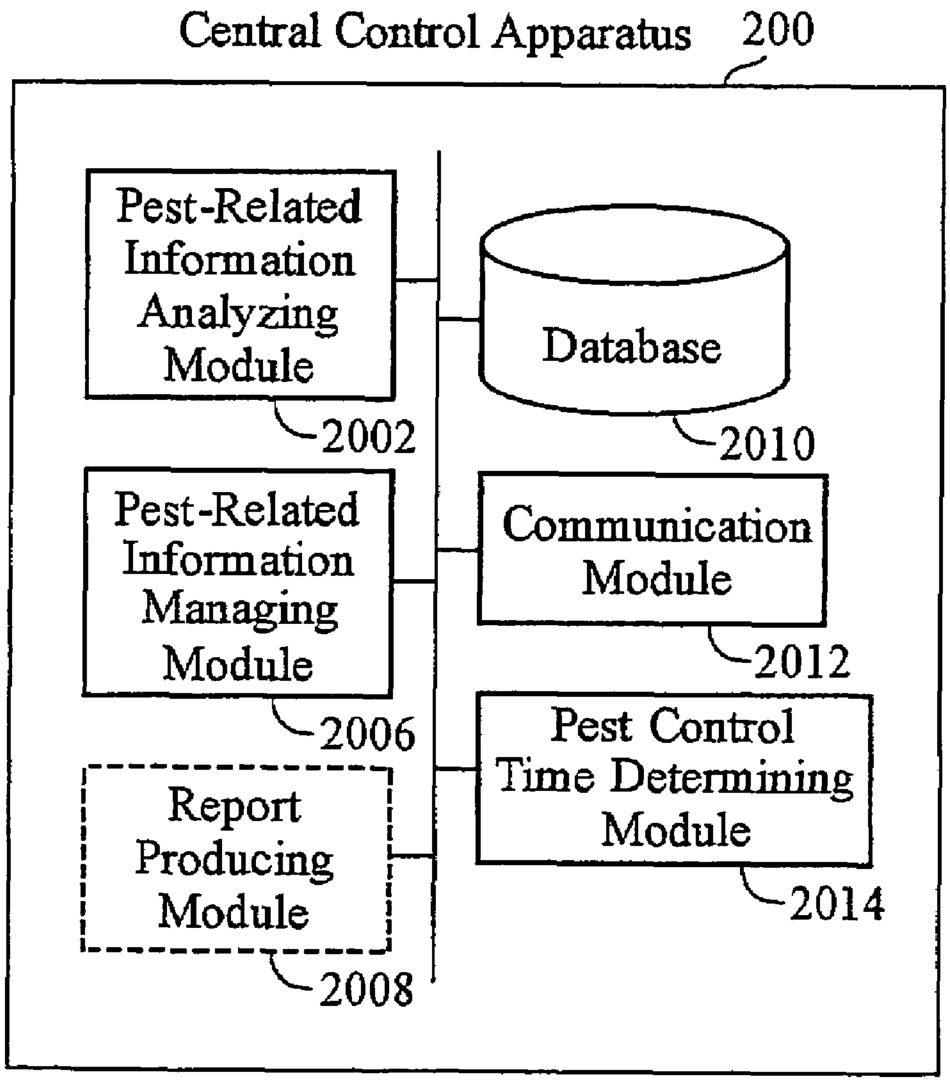
FIG. 5 is a schematic block diagram of an embodiment of a central control apparatus in the remote monitoring system shown in FIG. 1.

Referring to FIG. 5, a schematic block diagram is shown of an embodiment of the central control apparatus in the remote monitoring system shown in FIG. 1.

As shown, central control apparatus 200 comprises pest-related information analyzing module 2002, pest-related information managing module 2006, database 2010, communication module 2012, and pest control time determining module 2014. Pest-related information analyzing module 2002 receives the pest-related information transmitted periodically or in real time from remote monitoring apparatus 100 and analyze it. Pest-related information managing module 2006 stores, updates, and manages the pest-related information in database 2010. Database 2010 is managed by pest-related information managing module 2006. Communication module 2012 performs wired/wireless communications. Pest control time determining module 2014 determines the time when pest control needs to be performed. Central control apparatus 200 may further comprise report producing module 2008 for producing a report periodically or as needed with regard to the pest-related information (Report producing module 2008 is depicted with a dotted line in FIG. 5 to represent that it is an optional component).

Pest-related information analyzing module 2002 receives the pest-related information through communication module 2012 and analyzes it according to various categories. Specifically, pest-related information analyzing module 2002 analyzes the pest-related information to obtain data such as frequency of occurrence or invasion, the number of appearance and invasion, and the like, by various categories such as the building in which remote monitoring apparatus 100 is located, locations at which sensors 1002 are installed in each zone of a sectioned site, date and time, types of pest, and zone codes, or various other criteria used for performing pest control.

For example, the pest-related information classified by zone codes can be used to prepare a pest control measure with respect to a subject site as follows. If subject sites are a plurality of large-scale supermarkets, each having similar structure, then these supermarkets would be comprised of similar zones. In this case, an appropriate pest control measure may be obtained by comparing, among the large-scale supermarkets, the pest-related information of zones having identical zone code. For example, a service technician utilizes a relative value of pest appearance frequency for a particular zone code, as well as an absolute value of pest appearance frequency in each large-scale supermarket to establish a pest control measure. For example, in case the pest-related information of store zones in two large-scale supermarkets A and B are similar but pest appear more frequently in a warehouse zone of supermarket A than in that of supermarket B, the service technician determines that a pest generating factor exists in the warehouse of large-scale supermarket A rather than that of supermarket B so that an additional pest control measure is required for large-scale supermarket A.

In one embodiment of the present invention, pest-related information analyzing module 2002 decides grade for each sensor 1002 preferably in real time based on the number of pest detected by each sensor 1002. For example, pest-related information analyzing module 2002 decides the grade of each sensor 1002 as grade L1 when the number of detected pest is 1 to 3, grade L2 when the number of detected pest is 4 to 10, and grade L3 when the number of detected pest is 11 to 20. When the number of detected pest increases, the grade of each sensor 1002 goes up and, after the pest control operation is performed, the grade is reset. The grade of each sensor 1002 is useful for monitoring a status of pest appearance and determining whether or not an emergency pest control measure is required (detailed description will follow). Also, the analyzed information in pest-related information analyzing module 2002 may contain data regarding a history of pest appearance in each zone. With reference to the historical data, the service technician determines whether or not new pest have originated, whether or not a new invasion path has appeared, and whether or not pest control chemicals are effective. Preferably, the categories used for analyzing the pest-related information are easily added or deleted, as needed.

Pest-related information managing module 2006 stores in database 2010 the pest-related information transmitted from remote monitoring apparatus 100 periodically or in real time. Specifically, pest-related information managing module 2006 receives the pest-related information newly transmitted from remote monitoring apparatus 100 and adds to or updates the information stored in database 2010. Preferably, the various categories, which are used by pest-related information analyzing module 2002, are stored and managed in database 2010.

Pest control time determining module 2014 determines whether or not pest control operation is required immediately based on the analyzed result of pest-related information analyzing module 2002. In case of emergency, pest control time determining module 2014 notifies an alarm to the service technician.

Now, an example of how pest control time determining module 2014 utilizes the result by pest-related information analyzing module 2002 (hereinafter, "analysis result") is described in detail with reference to FIGS. 6 to 8.

FIG. 6 shows a table representing an analysis result as to the activities of cockroaches in a selected zone of the pest control subject site.

As shown in FIG. 6, the analysis result contains the number of detected cockroaches and grades assigned to each sensor for each of the ten sensors installed in the zone. As seen from the table, the selected zone contains three L1-graded sensors (1~3 cockroaches detected) and one L2-graded sensor (4~10 cockroaches detected). The analysis result per each type of pest in each zone is provided as shown in FIG. 6 by pest-related information analyzing module 2002, preferably in real time.

Pest control time determining module 2014 determines a pest control time using the analysis results as follows.

FIGS. 7*a* to 7*c* show examples of alarm tables used for determining pest control time by pest control time determining module 2014. The alarm tables for rats, cockroaches, and flying insects are shown in FIGS. 7*a*, 7*b*, and 7*c*, respectively.

The alarm tables of FIGS. 7*a* to 7*c* represent how the alarm type, i.e., one of alarms A, B, and C is determined according to the number of sensors of grade L1 or L2 of shown in FIG. 6. The alarm type represents the degree of seriousness of pest status in each zone. In an embodiment, alarm A indicates that the service technician has to carefully perform periodic pest control operation and alarms B and C indicate that the service technician must perform pest control operation immediately. Alternatively, the service technician may perform the pest control operation immediately in case alarm C occurs or in case that alarm B occurs over a predetermined number of times during a certain period.

For example, when rats appear, alarm B is notified when the number of sensors having grade L1 is 1 to 3, whereas alarm C is notified when the number of sensors having grade L1 is over 4 or grade L2 is over 1, as shown in alarm table 1 of FIG. 7*a*.

The type of alarm is determined by taking into account the types of pest and zones where pest appear, such that an alarm table may be changed according to the characteristics of the zones. For example, tables 1 to 3 shown in FIG. 7*b* are used for applying three different criteria according to zones, when cockroaches appear. In case that the number of sensors 1002 having grade L1 is 1, alarm A is notified according to table 1 of FIG. 7*b*, whereas alarm B is notified according to table 3. Table 1 of FIG. 7*b* is applicable to a zone such as a lavatory and a kitchen, where pest may originate at any time, whereas table 3 is applicable a zone such as a hotel room or a hospital ward, where the appearance of pest causes a serious problem.

Referring to FIG. 8, an application table is shown for determining which alarm table should be applied according to zone codes (that is, characteristics of zones). This application table may be updated by taking into account whether or not a subject site requires intensive monitoring and the special characteristic of zones. Not only for the cockroaches but also for the rats and flying insects, various alarm tables may be used.

Now, the application table will be described in detail with reference to the analysis result shown in FIG. 6. Herein, a subject site is limited to guest room No. 1003 and a lavatory on the $10^{th}$ floor in a hotel A. In this case, hotel A belongs to a large group, the $10^{th}$ floor belongs to a floor group, Room No. 1003 belongs to a middle group, and the guest room and the lavatory belong to a small group.

When fourteen cockroaches appear in the guest room No. 1003, four sensors among ten sensors 1002, which are installed at hotel A/$10^{th}$ floor/No. 1003/guest room, detect the cockroaches and the pest-related information is transmitted to central control apparatus 200. After that, the pest-related information is analyzed by pest-related information analyzing module 2002 according to the locations of the cockroaches' appearance, such that an analysis result as shown in FIG. 6 is obtained for each sensor 1002. In this case, pest-related information analyzing module 2002 gives grade L1 to sensor-1, sensor-3, and sensor-8, which sense 1 to 3 cockroaches and grade L2 to sensor-7, which senses 4 to 10 cockroaches. With reference to the application table shown in FIG. 8, table 3 of FIG. 7*b* is applied to guest room No. 1003. Since the number of sensors having grade L2 is 1, alarm C is notified, and the service technician performs an immediate pest control.

In case that the cockroaches appear in the lavatory, not in the guest room, table 1 of FIG. 7*b* is applied such that alarm A is notified unlike the case of the guest room. As described above, alarm A represents that the service technician has to carefully perform periodic pest control operation instead of doing immediate pest control.

However, if pest appear frequently, although not many, in the lavatory, immediate pest control is required even to the lavatory. In this case, pest control tine determining module 2014 utilizes the analysis information classified by an appearance frequency. For example, pest control time determining module 2014 may be set to notify alarm B if the number of L1-graded sensors is over three in a week, Therefore, the alarm tables of FIGS. 7*a* to 7*c*, as well as various tables to the pest-related information, may be applied to prepare for pest activity.

Communication module 2012 in central control apparatus 200 performs wired/wireless communications with receiving module 1008 in remote monitoring apparatus 100. Since the technologies for the wired/wireless communications are well known, a description thereof will be omitted here.

Now, report producing module 2008 will be described in detail with reference to FIGS. 9*a* and 9*b*. FIGS. 9*a* and 9*b* show examples of reports produced by report producing module 2008 of central control apparatus 200.

As shown in FIG. 9*a*, report producing module 2008 produces a pest control report at a predetermined time of a day based on the analysis result of pest-related information analyzing module 2002. The pest report of the embodiment may contain the population (number) of detected pest in each period (e.g., period 1, period 2, and period 3) and in each building 10, 12, and 14. Facilitating the production of pest control report is possible by classifying the pest related information by periods and buildings and by storing the pest-related information in remote monitoring apparatus 100 or central control apparatus 200. Number of pest active in each building 10, 12, and 14 is further classified by locations where sensors 1002 are installed. The number of captured pest detected by each sensor 1002 is classified by the type of pest and then recorded.

FIG. 9*b* shows an example of a zone report containing information with respect to zones of a sectioned subject site. The zone report in FIG. 9*b* is a report with respect to the production building of FIG. 3, which is sectioned into four stages.

The zone report is pre-stored in central control apparatus 200 so that the service technician may easily perform pest control operation with respect to each zone of the subject site based on the pre-stored zone report. After completing the pest control operation, the zone report may be updated. The zone report of FIG. 9*b* contains data fields such as a name of a zone, a location description field, a zone code field, equipment installed in the zone and its quantity field, and whether the zone is a vulnerable zone. Large, floor, middle, and small groups are shown in the second and third rows of the zone report and brief description for the location of each zone is provided on the location description field. (The location data enables the service technician to easily find each zone.) Zone codes corresponding to the zones are provided in the zone code field. In this embodiment, an identical zone code is assigned to a production department and a storage department, and therefore, identical equipment is provided to the both departments. The name and quantity of equipment installed at each zone are provided in the equipment/quantity field. The vulnerable zone field is marked in case that the frequency of pest appearance is higher than a predetermined level, or a zone is vulnerable to pest due to other reason. By examining this zone report, the service technician can easily understand the structure of the subject site. Further, the service technician can easily understand the status of the pest by using the zone report together with the pest-related information. Therefore, by using this type of report, the service technician easily obtains necessary information without relying upon individual memory and experience. Accordingly, even if the service technician for a specific subject site is switched, pest control may be effectively performed. Further, pest control is effectively done even if a person who is not assigned to a specific site is sent to the site, as long as the person has basic skills in pest control. The report in this specification include a report in hardcopy format as well as a screen-display, an electronic file, and an e-mail format.

By using these reports, the pest-related information, which is obtained from sensors 1002 installed at each sectioned zone, is systemically transmitted to the service technician. The service technician then examines the pest-related information of each zone to perform pest control operation.

Preferably, the reports are produced by using the analysis result of pest-related information analyzing module 2002. Such reports can be made periodically or as needed. Also, the reports are stored for a certain period of time and are statistically re-analyzed according to predetermined categories, thereby being used for pest control. Specifically, by storing and examining short-term reports accumulated over a long time, (e.g., a month, season, or year) secondary information related to pest control may be obtained from the examined reports. For example, if pest-related information in a pest control subject site, which had a similar trend for a long time, indicates a slightly increasing trend of pest appearance over a long period of time, then we can guess that a factor relating to pest appearance is introduced to the site and was not solved Further, by examining the reports over a long time, the effects of change of structure of the subject site or change of chemical for pest control on the pest activity may be observed Pest-related information, which is analyzed over a short term, can be sampled or averaged by a week or month to be used in deciding a long term trend.

The reports may contain position information as to where chemicals for exterminating a certain species of pest should be installed and the amount of the chemicals needed. Such data is determined by analyzing the pest-related information according to predetermined categories. In this case, the service technician can simply place the chemicals in the pest control subject site based on the report, so that the burdensome work of checking the location or amount of the chemicals may be reduced. The locations and amount of the chemicals may be determined based on the pest-related information (or secondary information derived from the pest-related information) from sensors 1002 by using a simple algebraic formula or by referencing a look-up table.

Further, in accordance with one embodiment of the present invention, the reports may contain activity information of a pest to be exterminated at a position where a chemical is used, before and after installing the chemicals for exterminating the pest The reports may be in the form of a graph where one can easily understand the trend. The reports are used to observe the effect of a chemical on a pest, and in case there is no effect, to determine that the pest in the corresponding area have developed tolerance to the chemicals used.

By using the zone report, positions of sensors 1002 and pest control equipment installed in each zone can be effectively managed. In the zone report, the type and quantity of the pest control equipment installed in each zone are represented. During pest control, the service technician takes proper measures to check as many equipment in each zone as identified in the zone report, eliminate captured pest, and check the function of equipment.

Figure 10:
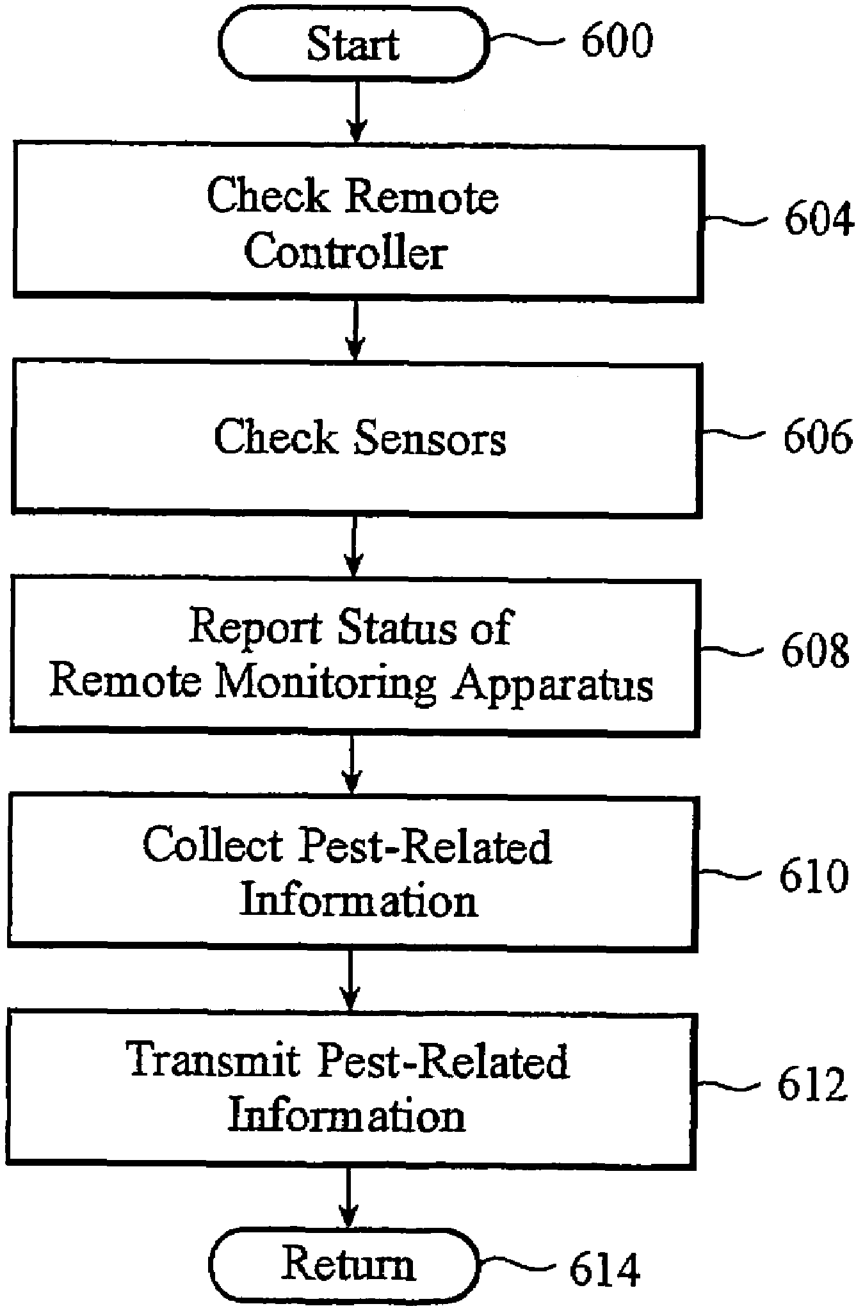
FIG. 10 is a flow chart of a main operation of the remote monitoring apparatus of the remote monitoring system shown in FIG. 1.
Figure 11:
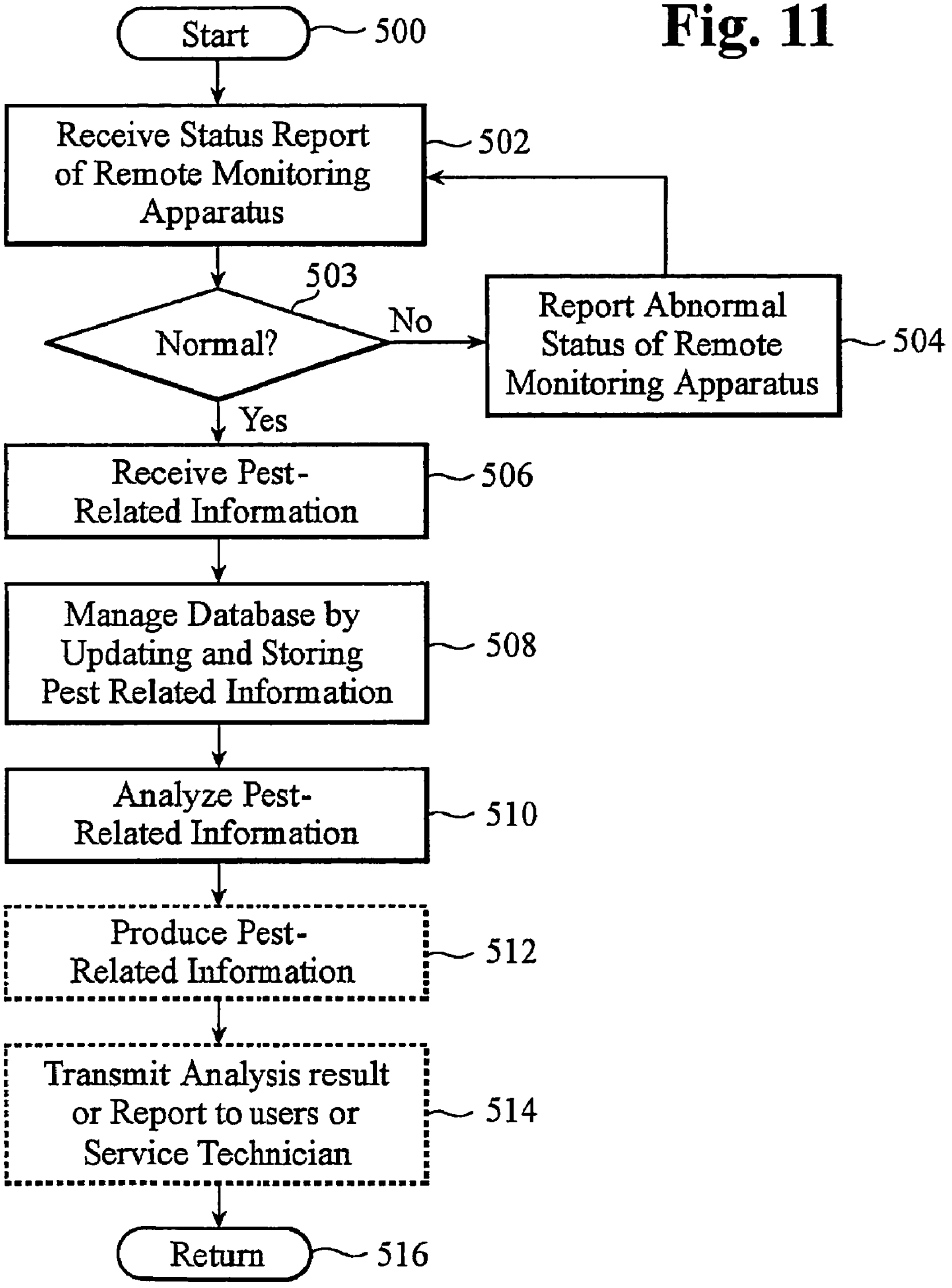
FIG. 11 is a flow chart of a main operation of the central control apparatus of the remote monitoring system shown in FIG. 1.

Now, the operation of the remote monitoring system for exterminating pest in accordance with one embodiment of the present invention will be described in detail with reference to FIGS. 10 and 11.

A main operation of remote monitoring apparatus 100 will be described with reference to FIG. 10. FIG. 10 is a flow chart showing the main operation of remote monitoring apparatus 100.

As shown, electric power is applied to start the operation (step 600) and components such as remote controller 1004 and sensors 1002 are checked (steps 604 and 606). As a result, the statuses of remote controller 1004 and sensors 1002 are transmitted and reported to central control apparatus 200 (step 608). Through this status reporting step, central control apparatus 200 becomes ready to communicate with remote controller 1004. Preferably, step 608 is periodically performed to periodically check the status of remote monitoring apparatus 100 in central control apparatus 200, as well as when the electric power is applied.

Next, remote monitoring apparatus 100 receives detection signals from sensors 1002 and collect pest-related information (step 610). Remote monitoring apparatus 100 then transmits the collected pest-related information to central control apparatus 200 (step 612).

The control process of the present invention is returned to one of steps 604 to 612 (step 614). The above steps do not need to be performed sequentially. Also, from power-on to power-off, all steps do not have to be repeated for a same number of times.

Main operations of central control apparatus 200 will be described with reference to FIG. 11. FIG. 11 is a flow chart that illustrates conceptually the main operation of central control apparatus 200.

As shown in figure, electric power is applied to start the operation (step 500). Central control apparatus 200 receives a status report, which represents whether or not remote controller 1004 and sensors 1002 are in normal state, from remote monitoring apparatus 100 (step 502), and determines whether or not remote controller 1004 and sensors 1002 are in abnormal state (step 503). In case that remote controller 1004 and sensors 1002 are in normal state, the control process of the present invention proceeds to next step. If the status of sensors 1002 or remote controller 1004 of remote monitoring apparatus 100 is decided to be abnormal, then, the abnormal state of remote monitoring apparatus 100 is reported to the service technician (step 504). For example, where sensors 1002 installed in an important zone, such as a guest room of a hotel are out of order, the service technician should immediately repair the failed sensors. Where the failed sensors are installed in a lavatory, the service technician repairs them during regular pest control operation. To obtain a reliable response, central control apparatus 200 may report the failure of sensors 1002 to the service technician after receiving a failure response of sensors 1002, e.g., three times.

Next, central control apparatus 200 receives the pest-related information transmitted from remote monitoring apparatus 100 (step 506). To receive the pest-related information reliably, it should be checked whether the communication module 2012 operates normally before step 506. This step is well known to a person skilled in the art, and therefore a detailed description will be omitted herein.

Then, central control apparatus 200 performs the database management operation. In other words, central control apparatus 200 compares the received pest-related information with the pest-related information that is pre-stored in database 2010, and updates and stores the information in database 2010 with the new pest-related information (step 508), as needed.

Central control apparatus 200 analyzes the pest-related information stored or updated in database 2010 based on predetermined categories for analysis (step 510). Preferably, analysis of the pest-related information is performed so as to find such information as the frequency of appearance or invasion, and the number of appearing or invading pest based on the various categories, such as each building where remote monitoring apparatus 100 are installed, positions of sensors 1002 in each building, specific time of a day, or species of pest to be exterminated.

Optionally, central control apparatus 200 may produce a report containing the analysis result of the pest-related information (step 512). Details of the report will be omitted since it has already been explained with reference to FIG. 9A and FIG. 9B. Central control apparatus 200 transmits the analysis result or the report to a user or service technical of each site 10, 12, and 14 (step 514). Step 514 also is an optional step.

The control process of the present invention returns to one of steps 502 to 514 (step 516).

The above steps do not need to be performed sequentially or repeated for a same number of times from power-on to power-off.

Now, another embodiment of the present invention will be explained.

Figure 12:
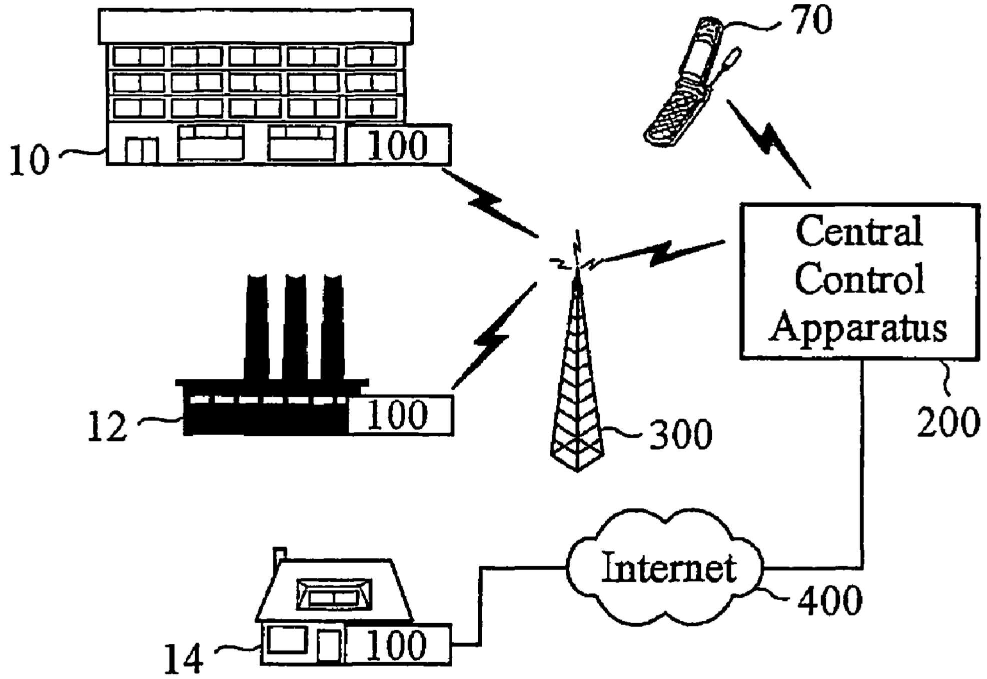
FIG. 12 is a schematic diagram of a remote monitoring system for exterminating pest in accordance with a second embodiment of the present invention.

FIG. 12 is a schematic diagram conceptually showing a remote monitoring system for exterminating pest in accordance with a second embodiment of the present invention. For ease of reference, components identical to those shown in FIG. 1 have the same reference numerals.

A difference between the first and second embodiments of the present invention is that central control apparatus 200 re-transmits the analysis result of the pest-related information to a user of each building 10, 12, and 14 and/or the service technician. Specifically, the service technician receives the analysis result of the pest-related information using mobile communication terminal 70, such as a personal digital assistant (DA) or a mobile phone, and performs pest control operation suitable for each site 10, 12, and 14.

Figure 13:
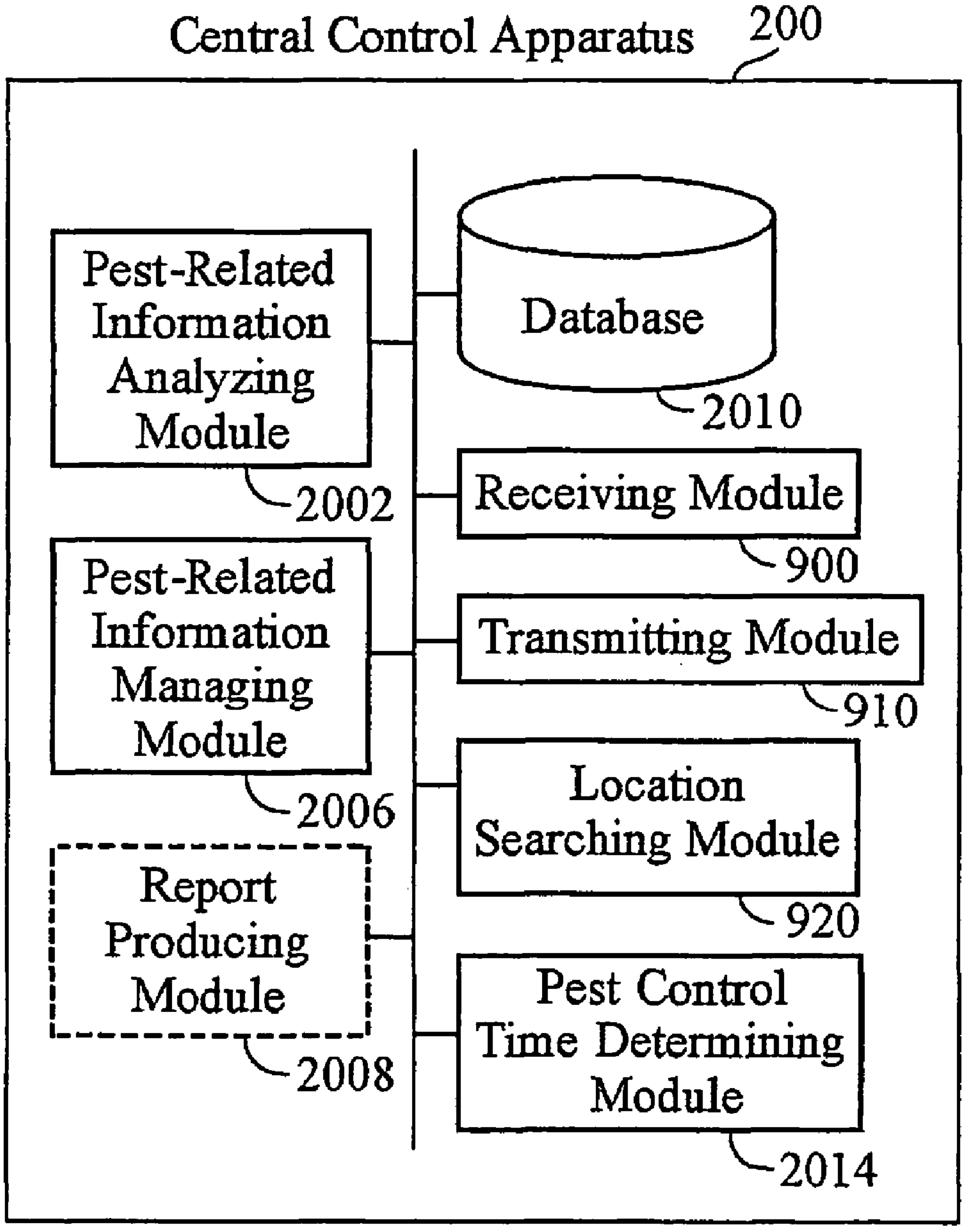
FIG. 13 is a schematic diagram of a central control apparatus in accordance with the second embodiment of the present invention.

FIG. 13 is a schematic diagram conceptually showing central control apparatus 200 in accordance with the second embodiment of the present invention.

In the second embodiment, central control apparatus 200 comprises receiving module 900 and transmitting module 910 instead of communication module 2012 of first embodiment. Also, central control apparatus 200 may optionally includes location searching module 920.

In the second embodiment, receiving module 900 receives pest-related information from remote monitoring apparatus 100 and transmits it to pest-related information analyzing module 2002. An analysis result is transmitted from pest-related information analyzing module 2002 to mobile communication terminal 70 of the service technician through transmitting module 910 of central control apparatus 200. The pest-related information is transmitted to the service technician periodically, or in response to a demand of the service technician, or according to other predetermined transmission protocol. For example, in case the service technician is scheduled to visit a pest control subject site, pest-related information of the pest control subject sites to be visited on a particular day is transmitted to mobile communication terminal 70 of the service technician on the basis of the visiting schedule. In this embodiment, where an emergency situation occurs in a pest control subject site, central control apparatus 200 searches locations of service technicians possessing mobile communication terminal 70 through location searching module 920 and transmits pest-related information to the service technician located nearest to that building where emergency happened. Location searching module 920 may receive location information of mobile communication terminal 70 whenever necessary using a global positioning system (GPS) in connection with mobile communication providers.

By using mobile communication terminal 70 and location searching module 920, paths of movements of service technicians may be effectively managed. For example, since central control apparatus 200 detects the location of each of the service technicians through mobile communication terminal 70, the order of visits for pest control may be effectively determined. If the work flow of pest control is determined such that a technician can first take care of the site with the least travel distance or travel time, depending on the traffic condition, the time required to travel is reduced so that the efficiency of pest control operation may be increased.

In accordance with the second embodiment of the present invention, the interval from the time when an emergency happens to the time when pest control is performed may be shortened. Generally, central control apparatus 200 is connected to a plurality of remote monitoring apparatuses 100 through wired or wireless communications, and thus, some remote monitoring apparatuses 100 may be located quite far from central control apparatus 200. In case the service technician receives an analysis result of pest-related information from central control apparatus 200 and then goes to a remote pest control subject site, it requires much time. If rats, which would give a sense of aversion to people, appear in the subject site, it is important to immediately exterminate the rats. In this case, according to the second embodiment of the present invention, the analysis result is automatically transmitted to a service technician nearest to the site where the rats appeared so that the service technician immediately exterminates the rats. Since the service technician can check other pest-related information on the way to the subject site, he may perform a regular examination and other pest control operation together with the extermination of the rats.

Figure 14:
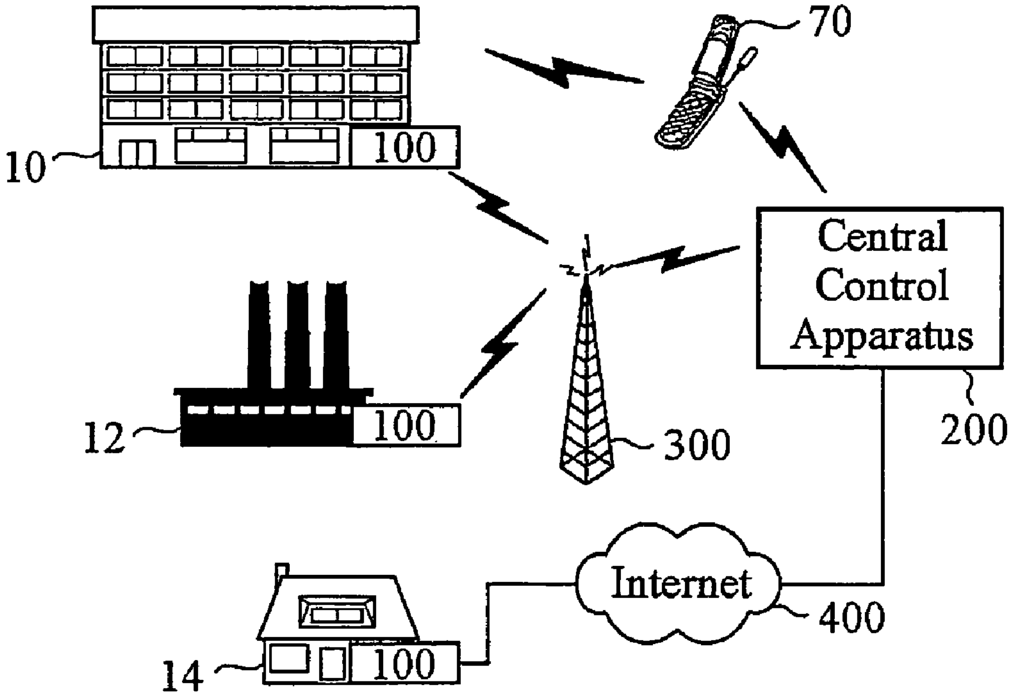
FIG. 14 is a schematic diagram of a remote monitoring system for exterminating pest in accordance with a third embodiment of the present invention.

FIG. 14 shows a schematic diagram a remote monitoring system for exterminating pest in accordance with a third embodiment of the present invention. For ease of reference, components identical to those shown in FIG. 1 have the same reference numerals.

A difference between the second and third embodiments of the present invention is that pest-related information may be directly transmitted from remote monitoring apparatus 100 to mobile communication terminal 70 in the third embodiment. Although mobile communication terminal 70 shown in FIG. 14 communicates with remote monitoring apparatus 100 by wireless communication, mobile communication terminal 70 can also be configured to communicate with remote monitoring apparatus 100 by both wired and wireless communication. In the third embodiment of the present invention, the service technician may receive an instruction to move to a pest control subject site from remote monitoring apparatus 100 installed at that site or central control apparatus 200. He can also receive pest-related information from both.

Figure 15:
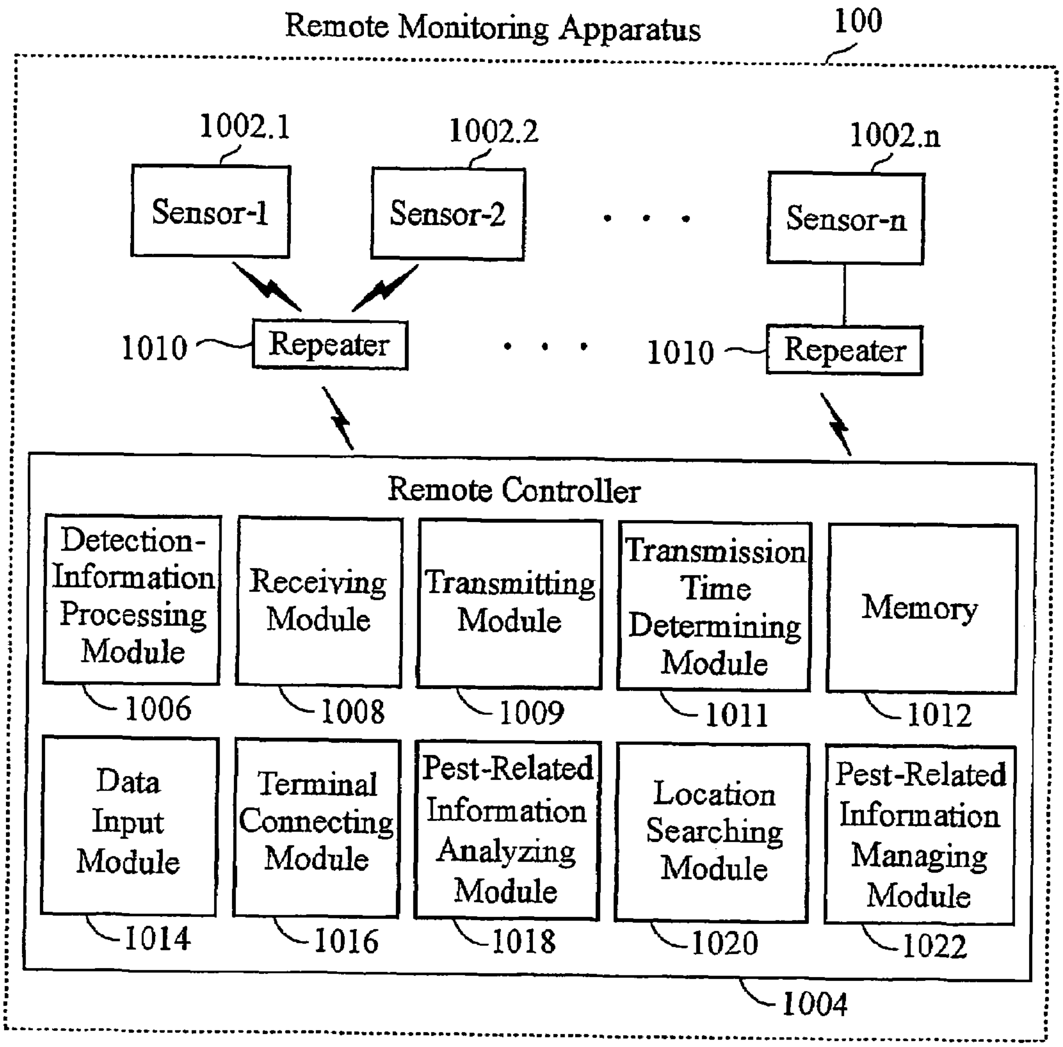
FIG. 15 is a schematic diagram of a remote monitoring apparatus in accordance with the third embodiment of the present invention.

FIG. 15 shows a schematic diagram of remote monitoring apparatus 100 in accordance with a third embodiment of the present invention.

Compared to the first embodiment, remote controller 1004 in the third embodiment further includes pest-related information analyzing module 1018, pest-related information managing module 1022, and terminal connecting module 1016. Also, optionally, location searching module 1020 may be added to remote controller 1004.

Location searching module 1020 installed at remote controller 1004 search a location of mobile communication terminal 70. Detailed analysis of information is performed in pest-related information analyzing module 1018 in remote monitoring apparatus 100. The procedure for analyzing information in pest-related information analyzing module 1018 is identical to that of central control apparatus 200. An analysis result is stored in memory 1012 by pest-related information managing module 1022. A service technician receives an instruction to go to a pest control subject site through mobile communication terminal 70 and then go to the site. In the site, the service technician then connects mobile communication terminal 70 to terminal connecting module 1016 of remote controller 1004 by wired/wireless communication. When mobile communication terminal 70 is connected to terminal connecting module 1016, terminal connecting module 1016 retrieves the analysis result of the pest-related information stored in memory 1012 to transmit to mobile communication terminal 70. The service technician performs pest control on the basis of the analysis result received through mobile communication terminal 70. In accordance with the third embodiment of the present invention, remote controller 1004 may comprise a report producing module (not shown) and transmit a report produced by the report producing module to mobile communication terminal 70 through terminal connecting module 1016. For example, after checking a report including information on sectioning of a site through the display of mobile communication terminal 70, the service technician performs pest control suitable for the structure of the site.

In the third embodiment of the present invention, most of information related to pest is directly transmitted from remote monitoring apparatus 100 to mobile communication terminal 70 without using a commercial wireless communication service. As a result, costs for wireless communication may be reduced.

Similar to the second embodiment, location searching module 1020 may be employed in the third embodiment of the present invention for searching a location of a service technician nearest to a pest control subject site. Further, when an emergency happens, an instruction to move to a pest control subject site is directly transmitted from remote monitoring apparatus 100 to mobile communication terminal 70 of a service technician nearest to the pest control subject site.

Although the analysis of the pest-related information is performed in remote controller 1004 in the embodiment explained above, mobile communication terminal 70 can be configured to analyze pest-related information by adding a program or separate hardware to mobile communication terminal 70. That is, mobile communication terminal 70 may comprise a pest-related information analyzing module. The procedure to be performed in mobile communication terminal 70 is identical to that of central control apparatus 200.

In accordance with the second and third embodiments of the present invention, pest control may be performed by a service technician nearest to a pest control subject site. Conventionally, each service technician is assigned to a corresponding subject site so that only the assigned service technician performs a pest control in the corresponding subject site. As a result, if the service technician for a specific pest control subject site is suddenly switched, effective pest control on that site is very difficult, since new service technician has no systematic data on the subject site. However, in the second and third embodiments of the present invention, service technicians obtain analyzed pest-related information on a pest control subject site from central control apparatus 200 or remote monitoring apparatus 100 while moving to the subject site, so that any one of the service technicians may effectively perform pest control.

While the present invention has been shown and described with respect to the particular embodiments, those skilled in the art will recognize that many changes and modifications may be made without departing from the scope of the invention as defined in the appended claims.

INDUSTRIAL APPLICABILITY

In accordance with the present invention, pest-related information can be obtained and analyzed according to various categories.

Also, in accordance with the present invention, a central control center systematically manages pest-related information collected from each building.

Further, in accordance with the present invention, pest-related information may be collected and managed, and pest control can be effectively performed based on the pest-related information.

Furthermore, in accordance with the present invention, the activity and invasion of pest may be detected in real time using sensors. Pest control measure maybe prepared through collection and analysis of the detected information. In addition, the invasion of pest may be prevented by surveying regional distribution and seasonal distribution of the pest appearance. Since exact path and time of the pest invasion, and the number of pest are examined to prepare a measure, proper position and chemical can be selected based on it, thereby preventing the abuse of chemicals and the economic loss of human resources and time.

Also, in accordance with the present invention, a service technician easily obtains information required for performing pest control without relying on his memory and experience. As a result, even if the service technician is changed, pest control may be effectively performed.

Further, in accordance with the present invention, necessary pest-related information can always be provided to service technicians and-the time taken to move to a pest control subject site may be reduced by managing the travel paths of service technicians.

The invention claimed is:

1. A remote monitoring system for exterminating vermin, comprising:

at least one sensor, installed at a plurality of zones of a vermin control subject building, for sensing movement of the vermin in each zone, producing and transmitting sensed signals corresponding to the movement;

at least one remote controller, installed at the vermin control subject building, for receiving and processing the sensed signals to transmit vermin-related information;

a central control apparatus for receiving the vermin-related information from said at least one remote controller, and processing the vermin-related information for each zone;

wherein at least one remote controller further includes a vermin-related information analyzing module determining grades for each sensor on the basis of population of the sensed vermin, and the remote controller further includes a vermin control time determining module that determines a vermin control time of zones on the basis of the grade of each sensor, and each zone where said each sensor is installed.

2. The system of claim 1, further comprising at least one repeater, installed at the vermin control subject building, for receiving the sensed signals and re-transmitting them to said at least one remote controller.

3. The system of claim 1, wherein said at least one sensor comprises at least one out of a first sensor for sensing movement of cockroaches, a second sensor for sensing movement of rats, and a third sensor for sensing movement of flying insects.

4. The system of claim 1, wherein said at least one sensor is implemented by integrating a heat detector or a movement detector to one selected from a group consisting of an insect luring light, an automatic chemical dispenser, and a luring frame for capturing rodents.

5. The system of claim 1, wherein said at least one remote controller further comprises:

a receiving module for receiving the sensed signals from said at least one sensor;

a sensed information processing module for processing the sensed signals received from the receiving module and collecting vermin-related information; and a transmitting module for transmitting the vermin-related information to the central control apparatus.

6. The system of claim 5, wherein said at least one remote controller further comprises a data input module for receiving information related to an outbreak of the vermin from either or both of a user of the vermin control subject building and a vermin control manager, wherein the information is manually inputted by either or both of the user and the vermin control manager.

7. The system of claim 5, wherein said at least one remote controller further comprises:

a transmission time determining module for determining whether to transmit the vermin-related information immediately or not; and a memory capable of temporally storing the vermin-related information until the transmission of the vermin-related information in case the transmission time determining module determining not to transmit the vermin-related information immediately.

8. The system of claim 1, wherein the central control apparatus further comprises:

a vermin-related information managing module for storing and updating the vermin-related information received from said at least one remote controller, thereby managing the vermin-related information;

a database for storing the vermin-related information, which is managed by the vermin-related information managing module; and a communication module for performing wire/wireless communications.

9. The system of claim 1, wherein said at least one sensor produces the sensed signals in response to sensing of the vermin and the sensed signals are transmitted together with an identification of each sensor.

10. The system of claim 8, wherein the central control apparatus further comprises a location searching module for searching a location of a mobile communication terminal belonging to a vermin control manager, and a vermin-related information analyzing block for analyzing the vermin-related information, wherein the communication module transmits the analysis result of the vermin-related information to the mobile communication, terminal searched by the location searching module.

11. The system of claim 7, wherein:

the vermin-related information analyzing module is used for analyzing the vermin-related information received from the sensed information processing module; and said at least one remote controller further comprises:

a vermin-related information managing module for storing in the memory at least part of the vermin-related information and the analysis result of the vermin-related information analyzed by the vermin-related information analyzing module and updating the stored information, thereby managing the information; and a terminal connecting module for transmitting the analysis result of the vermin-related information from the memory to a mobile communication terminal, when the mobile communication terminal is connected to the terminal connecting module.

12. The system of claim 7, wherein the transmission time determining module determines to transmit the vermin-related information at a predetermined time when cockroaches and/or flying insects are sensed, and to transmit immediately the vermin-related information when rats are sensed.

13. The system of claim 1, wherein said at least one sensor and said at least one remote controller periodically check a status including a breakdown and transmit information related to the checked status to the central control apparatus.

14. A remote monitoring method for exterminating vermin, comprising the steps of:

sectioning a vermin control subject building into a plurality of zones;

collecting vermin-related information by sensing active vermin in each of the sectioned zones;

transmitting the collected vermin-related information to a central control apparatus;

analyzing the transmitted vermin-related information;

updating and storing the analyzed vermin-related information by comparing with pre-stored information in a database;

determining a vermin control time on the basis of the analyzed vermin-related information;

searching a location of a vermin control manager; and transmitting the analyzed vermin-related information to a mobile communication terminal belonging to the vermin control manager.

15. The method of claim 14, wherein the sectioning step includes sectioning the vermin control subject building into zones on the basis of a function of each zone.

16. The method of claim 14, wherein the sectioning step includes sectioning the vermin control subject building into zones of minimum unit on which a vermin control work is to be performed.

17. The method of claim 16, further comprising the step of assigning a code to each zone of minimum unit, wherein the step of analyzing the vermin-related information comprises, arranging the vermin-related information according to the codes assigned to the zones; and searching a vermin-related information that is out of a predetermined range when compared to the other information arranged for the same code.

18. The method of claim 14, wherein the vermin-related information is transmitted at a predetermined time when cockroaches or flying insects are sensed, and immediately transmitted when rats are sensed.

19. The method of claim 14, wherein the analyzing of the vermin-related information includes the step of determining population of appearing and captured vermin according to one or more categories including locations in the vermin control subject building, time periods, and the type of vermin.

20. The method of claim 19, wherein the analyzed vermin-related information is transmitted to the mobile communication terminal together with information of a shortest route from the vermin control manager to the vermin control subject building.

* * * * *